US006528112B2

(12) United States Patent
Kato et al.

(10) Patent No.: US 6,528,112 B2
(45) Date of Patent: Mar. 4, 2003

(54) TRANSPARENT CONDUCTIVE LAYERED STRUCTURE AND METHOD OF PRODUCING THE SAME, AND COATING LIQUID FOR FORMING TRANSPARENT CONDUCTIVE LAYER USED IN PRODUCTION OF TRANSPARENT CONDUCTIVE LAYERED STRUCTURE AND METHOD OF PRODUCING THE SAME

(75) Inventors: Kenji Kato, Chiba (JP); Masaya Yukinobu, Chiba (JP)

(73) Assignee: Sumitomo Metal Mining Co., Ltd., Tokyo (JP)

( * ) Notice: Subject to any disclaimer, the term of this patent is extended or adjusted under 35 U.S.C. 154(b) by 0 days.

(21) Appl. No.: 10/134,476

(22) Filed: Apr. 30, 2002

(65) Prior Publication Data

US 2002/0168478 A1 Nov. 14, 2002

Related U.S. Application Data

(62) Division of application No. 09/477,447, filed on Jan. 4, 2000, now Pat. No. 6,447,909.

(30) Foreign Application Priority Data

Jan. 14, 1999 (JP) ............................... 11-008412
Jan. 14, 1999 (JP) ............................... 11-008413

(51) Int. Cl.$^7$ .............................. B05D 5/06; B05D 5/12; B05D 3/02; B05D 1/36
(52) U.S. Cl. ..................... 427/164; 427/165; 427/402; 427/404; 427/419.1; 427/376.1; 427/376.6; 427/383.1
(58) Field of Search .................. 427/402, 404, 427/419.1, 376.1, 376.6, 383.1, 164, 165

(56) References Cited

U.S. PATENT DOCUMENTS 5,785,897 A    7/1998   Toufuku et al. ............ 202/514
6,261,479 B1   7/2001   Yukinobu et al. ........... 252/514
6,335,056 B1 * 1/2002   Lee et al. ................ 427/372.2

FOREIGN PATENT DOCUMENTS

| EP | 0 649 160 A1 | 4/1995 |
| EP | 0 803 551 A2 | 10/1997 |
| EP | 0 893 551 A3 | 3/1998 |
| EP | 0 911 859 A  | 10/1998 |
| JP | 8-77832      | 3/1996 |
| JP | 9-55175      | 2/1997 |

OTHER PUBLICATIONS

Patent Abstracts of Japan, vol. 1996, No. 02, Feb. 29, 1996 and JP 07 268251A, Oct. 17, 1995.
Patent Abstracts of Japan, Publication No. 09115438, dated May 2, 1997.
Patent Abstracts of Japan, Publication No. 07282745, Oct. 27, 1995.

* cited by examiner

Primary Examiner—Michael Barr
(74) Attorney, Agent, or Firm—Armstrong, Westerman & Hattori, LLP

(57) ABSTRACT

The present invention relates to a transparent conductive layered structure having a transparent substrate and a transparent conductive layer and transparent coating layer formed in succession on this substrate, used in, for instance, the front panel of CRT, etc., display devices. The main components of said transparent conductive layer are noble metal microparticles with a mean particle diameter of 1 to 100 nm, wherein the microparticles are made from gold and/or platinum and silver and the gold and/or platinum content is within a range exceeding 50 wt % up to 95 wt %, and a binder matrix. Moreover, the main components of the coating liquid used to form a transparent conductive layer in the production of a transparent conductive layered structure are solvent and noble metal-coated silver microparticles with a mean particle diameter of 1 to 100 nm dispersed in this solvent, wherein the surface of the silver microparticles is coated with gold or platinum only or a compound of gold and platinum and the gold and/or platinum content is within a range exceeding 50 wt % up to 95 wt %.

5 Claims, 7 Drawing Sheets

TRANSPARENT CONDUCTIVE LAYERED STRUCTURE AND METHOD OF PRODUCING THE SAME, AND COATING LIQUID FOR FORMING TRANSPARENT CONDUCTIVE LAYER USED IN PRODUCTION OF TRANSPARENT CONDUCTIVE LAYERED STRUCTURE AND METHOD OF PRODUCING THE SAME

This application is a divisional of prior application Ser. No. 09/477,447 filed Jan. 4, 2000, now U.S. Pat. No. 6,447,909 which is hereby incorporated by reference.

BACKGROUND OF THE INVENTION

1. Field of the Invention

The present invention relates to a transparent conductive layered structure having a transparent substrate and a transparent conductive layer and transparent coating layer formed in succession on this substrate, which is used in front panels of display devices such as CRT, etc. The present invention particularly relates to a transparent conductive layered structure with excellent weather resistance, ultraviolet ray resistance, conductivity, etc., and with which a reduction in production cost is expected and a method of producing the same, and a coating liquid for forming a transparent conductive layer used in the production of a transparent conductive layered structure and a method of producing the same.

2. Description of the Prior Art

Many OA devices have been introduced to the office as a result of office automation (OA) in recent years and an environment in which the entire day work must be done facing the display of an OA device is no longer uncommon.

However, when a job is done next to a cathode ray tube (CRT) of a computer, etc., as an example of OA equipment, it must be easy to see the display screen in order to prevent visual fatigue, as well as prevent deposition of dust and electric shock induced by the electrostatic charge on the CRT screen, etc. Furthermore, in addition to these requirements, etc., there has recently been concern over the detrimental effects of low-frequency electromagnetic waves generated by CRTs on the human body and there is a demand for CRTs with which there is no leakage to the outside of such electromagnetic waves.

The above-mentioned electromagnetic waves are generated from deflecting coils and fly-back transformers and the development of larger televisions has led to a tendency toward leakage of increasingly larger amounts of electromagnetic waves around televisions.

For the most part, leakage of a magnetic field can be prevented by techniques such as changing the shape of the deflecting coil, etc. On the other hand, it is also possible to prevent leakage of an electric field by coating the front glass surface of a CRT with a transparent conductive layer.

Such methods for preventing leakage of an electric field are theoretically the same as measures that have been adopted in recent years to prevent electrostatic charging. However, the conductivity of the above-mentioned transparent conductive layer must be much higher than that of conductive layers that are formed to prevent electrostatic charging. That is, although surface resistance of $10^8$ $\Omega/\square$ (ohm per square) is enough to prevent electrostatic charging, a transparent conductive layer with at least as low a resistance as $10^6$ $\Omega/\square$ or less, preferably $10^3$ $\Omega/\square$ or less, is preferred in order for prevention of leakage of an electric field (electric field shielding).

Therefore, several suggestions have been made thus far for meeting the above-mentioned requirements, but of these, the method wherein a coating liquid for forming a transparent conductive layer of conductive microparticles dispersed with inorganic binder, such as alkyl silicate, etc., in a solvent is applied to the front glass of a CRT and dried and then baked at a temperature of 200° C. is known as a method with which low cost and low surface resistance can be realized.

In addition, this method that uses a coating liquid for forming a transparent conductive layer is very simple when compared to other methods of forming transparent conductive layers, such as vacuum evaporation and sputtering, has a low production cost, and is a very useful method in terms of electric field shielding treatment of CRTs.

It is known that the above-mentioned coating liquid that is used to form a transparent conductive layer used by this method employs indium tin oxide (ITO) as the conductive microparticles. However, because surface resistance of the film that is obtained is high at $10^4$ to $10^6$ $\Omega/\square$, a corrective circuit for canceling the electric field is needed in order to sufficiently block leakage of an electric field. Therefore, there has been a problem in that production cost rises accordingly. On the other hand, when compared to coating liquids that use ITO, a film with somewhat lower transmittance, but also low resistance of $10^2$ to $10^3$ $\Omega/\square$, is obtained with coating liquids for forming transparent conductive layers that use metal powder for the above-mentioned conductive microparticles. Consequently, there is an advantage in terms of cost because the above-mentioned correcting circuit is not necessary, and this will probably be the prevailing method of the future.

Moreover, the metal microparticles that are used in the above-mentioned coating liquid for forming the above-mentioned transparent conductive layer are limited to noble metals, such as silver, gold, platinum, rhodium, palladium, etc., that rarely oxidize in air, as shown in Japanese Patent Applications Laid-Open No. H 8-77832 and Laid-Open No. H 9-55175. This is because if microparticles of a metal other than a noble metal, such as iron, nickel, cobalt, etc., are used, an oxide film is invariably formed on the surface of such metal microparticles in an air atmosphere and good conductivity cannot be obtained as a transparent conductive layer.

Moreover, on the other hand, in order to make the display screen easy to see, anti-glare treatment is performed on the face panel surface to prevent reflection on the screen. This antiglare treatment is performed by the method whereby fine irregularities are made in the surface in order to increase diffused reflection at the surface, but it cannot be said that this method is a very desirable method because when used, resolution decreases and picture quality drops. Consequently, it is preferred that antiglare treatment be performed by the interference method whereby the refractive index and film thickness of the transparent film be controlled so that there is destructive interference of the incident light by the reflected light. A two-layered film structure wherein optical film thickness of film with a high refractive index and film with a low refractive index has been set at ¼λ and ¼λ (λ is wavelength), or ½λ and ¼λ, respectively, is usually used in order to obtain this type of low-reflection effect of the interference method, and film consisting of the above-mentioned indium tin oxide (ITO) microparticles is also used as this type of film with a high refractive index.

Furthermore, of the parameters that make up the optical constant (n-ik, n: refractive index, $i^2=-1$, k: extinction coefficient) of metals, the value of n is small, but the value of k is very large when compared to ITO and therefore, even if a transparent conductive layer consisting of metal microparticles is used, the same anti-reflection activity induced by interference of light as seen with ITO is obtained with the two-layered film structure.

However, as previously mentioned, the metal microparticles used in conventional coating liquid for forming a transparent conductive layer are limited to noble metals such as silver, gold, platinum, rhodium, palladium, etc. Nevertheless, when the specific resistance of these is compared, resistivity of platinum, rhodium, and palladium is 10.6, 5.1, and 10.8 $\mu\Omega\cdot$cm, respectively, which is high when compared to the 1.62 and 2.2 $\mu\Omega\cdot$cm of silver and gold. Therefore, it is more of an advantage to use silver microparticles and gold microparticles to form a transparent conductive layer with low surface resistance.

There was, however, a problem with weather resistance in that there was severe deterioration due to sulfurization, oxidation, and exposure to ultraviolet rays and brine, when silver microparticles were used, while when gold microparticles were used, there were none of the above-mentioned problems with weather resistance, but there were the same problem with cost as when platinum microparticles, rhodium microparticles, palladium microparticles, etc., were used. Furthermore, the use of gold microparticles posed a problem in that because the transparent conductive layer itself that was formed adsorbed some of the visible light rays due to optical properties inherent to metals, it could not be used for the display surface of displays such as CRTs, etc., which require a flat transmitted light profile within the entire visible light region.

In light of this related art, the inventors previously presented a coating liquid for forming a transparent conductive layer in which are dispersed noble metal-coated silver microparticles with a mean particle diameter of 1 to 100 nm, wherein the surface of the silver microparticles is coated with gold or platinum only or a compound of gold and platinum in place of the above-mentioned silver or gold microparticles, and a transparent conductive layered structure produced using this coating liquid, as well as a display that uses this layered structure, etc. (refer to each Specification of Japanese Patent Applications No. H9-309350, No. H9-309351, No. H9-332400, and No. H9-332401).

Moreover, improvement of weather resistance, chemical resistance, etc., is expected when the surface of the silver microparticles is coated with gold or platinum only or a compound of gold and platinum because the silver inside the noble-metal coated silver microparticles is protected by the gold or platinum only or by the compound of gold and platinum.

That is, the above-mentioned transparent conductive layer of the transparent conductive layered structure is obtained by applying a coating liquid for forming a transparent conductive layer in which noble metal-coated silver microparticles have been dispersed on a transparent substrate and a successive heat treatment. Moreover, by means of this heat treatment, each of the noble metal-coated silver microparticles bond together with the gold or platinum only or compound of gold and platinum remaining coated on the surface of the silver microparticles, constituting noble metal microparticles comprising gold and/or platinum and silver. Therefore, the silver inside the noble metal microparticles is protected by gold or platinum only, or by a compound of gold and platinum, and improvement of weather resistance, chemical resistance, etc., of the noble metal microparticles in the transparent conductive layer is expected.

Furthermore, the inventors also studied methods of making alloy particles by alloying the silver with gold or platinum, or gold and platinum, and thereby improving properties, such as the above-mentioned weather resistance, etc., in place of the above-mentioned method whereby gold or platinum only or a compound of gold and platinum is coated on the surface of silver microparticles.

However, when an aqueous solution of chloroaurate or chloroplatinate and silver salt is used as the starting solution for making the above-mentioned alloy microparticles by the wet method, which is commonly used for microparticle preparation, there is a problem in that sparingly-soluble silver chloride is produced when these are mixed. Moreover, although the above-mentioned problem is not produced when a cyanogen complex salt is used for the gold salt, platinum salt and silver salt, there is a problem in that it becomes necessary to handle toxic cyanogen compounds and synthesis of alloy microparticles of the gold or platinum and silver is not easy.

Therefore, the inventors planned to not use the latter method and to solve the above-mentioned conventional problems by the former method that uses noble metal-coated silver microparticles.

However, depending on the conditions of heat treatment after applying the coating liquid for forming a transparent conductive layer on a transparent substrate of the former method that uses noble metal-coated silver microparticles, an alloyed layer is made wherein part of the silver is diffused to inside the noble metal coating layer formed from gold and/or platinum and some of this alloyed layer is exposed at the surface.

In addition, this alloyed layer poses problems in that because there is deterioration of chemical stability when compared to the noble metal coating layer formed from gold and/or platinum, there is accordingly a slight drop in weather resistance, ultraviolet ray resistance, chemical resistance, etc., and this becomes particularly obvious with an increase in the percentage of silver in the above-mentioned alloyed layer.

SUMMARY OF THE INVENTION

The present invention focuses on such problems, its object being to present a transparent conductive layered structure with which there is rarely a reduction in weather resistance, ultraviolet ray resistance, etc., even when the heat treatment conditions during production are set as needed.

Another object of the present invention is to present a production method for obtaining a transparent conductive layered structure with excellent weather resistance, ultraviolet ray resistance, conductivity, etc., even when the heat treatment conditions during production are set as needed.

Yet another object of the present invention is to present a coating liquid for forming a transparent conductive layer that is used in the production of a transparent conductive layered structure with excellent weather resistance, ultraviolet ray resistance, conductivity, etc.

Still another object of the present invention is to present a method of producing the above-mentioned coating liquid for forming a transparent conducive layer.

That is, the present invention is a transparent conductive layered structure comprising a transparent substrate, a transparent conductive layer; and a transparent coating layer, wherein said transparent conductive layer and transparent coating layer are formed in succession on said transparent substrate, and the main components of said transparent conductive layer are noble metal microparticles made from gold and/or platinum and silver with a mean particle diameter of 1 to 100 nm and a gold and/or platinum content within a range exceeding 50 wt % up to 95 wt % and binder matrix.

Moreover, the method of producing the transparent conductive layered structure of the present invention comprises the steps of applying a coating liquid for forming a transparent conductive layer on said transparent substrate, then applying a coating liquid for forming the transparent coating layer; and performing heat treatment, with the main components of said coating liquid for forming a transparent conductive layer being noble metal-coated silver microparticles with a mean diameter of 1 to 100 nm, wherein the surface of silver microparticles is coated with gold or platinum only or a compound of gold and platinum and the content of gold and/or platinum is within a range exceeding 50 wt % up to 95 wt %, and a solvent that will disperse these microparticles.

Next, the coating liquid for forming a transparent conductive layer used to produce the above-mentioned transparent conductive layered structure comprises as its main components solvent and noble metal-coated silver microparticles with a mean particle diameter of 1 to 100 nm dispersed in the solvent, wherein the surface of the silver microparticles is coated with gold or platinum only or a compound of gold and platinum and the gold and/or platinum content is within a range exceeding 50 wt % up to 95 wt %.

In addition, the method of producing this coating liquid for forming a transparent conductive layer comprises the steps of adding reducing agent and alkali metal aurate solution and/or alkali metal platinate solution, or said reducing agent and mixed solution of alkali metal aurate and platinate, to a colloidal dispersion of silver microparticles and adjusting each mixture ratio of the colloidal dispersion of silver microparticles and alkali metal aurate solution and/or alkali metal platinate solution, or colloidal dispersion of silver microparticles and mixed solution of alkali metal aurate and alkali metal platinate, to obtain a colloidal dispersion of noble metal-coated silver microparticles having a gold and/or platinum content within a range exceeding 50 wt % up to 95 wt % and thereby prepare noble metal-coated silver microparticles by a noble metal-coated silver microparticle preparation process, desalting in order to reduce the electrolyte concentration of said colloidal dispersion of noble metal-coated silver microparticles and concentrating in order to concentrate said colloidal dispersion and thereby obtain a concentrated dispersion of noble metal-coated silver microparticles by a desalting and concentrating process, and adding and mixing solvent only, or solvent comprising conductive oxide microparticles and/or inorganic binder, with said concentrated dispersion of noble metal-coated silver microparticles to obtain a coating liquid for forming a transparent conductive layer by a solvent mixing process.

DESCRIPTION OF THE PREFERRED EMBODIMENTS

Figure 1:
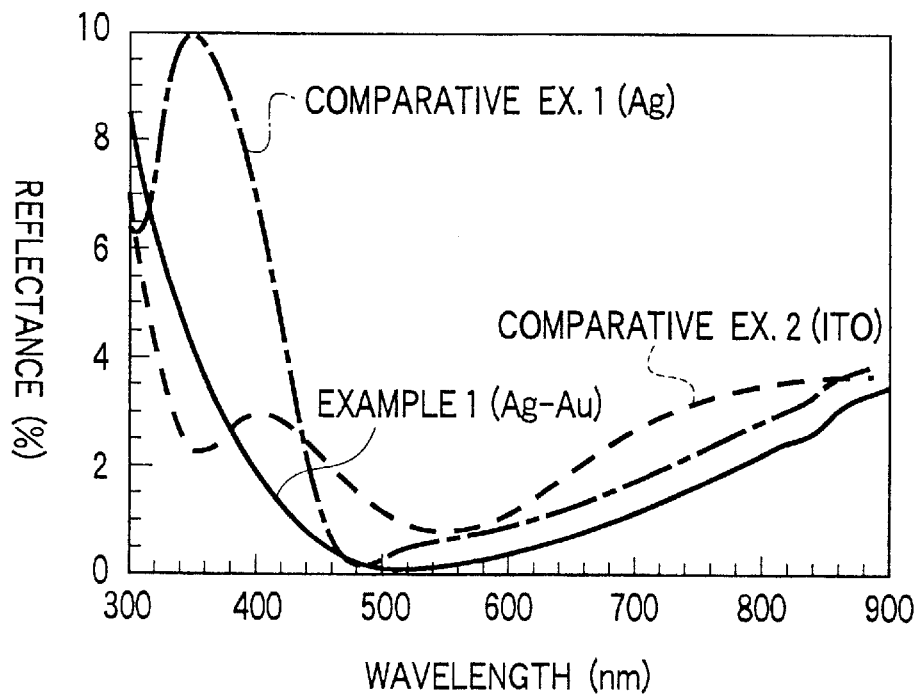
FIG. 1 is a graph showing the reflection profile of the transparent conductive layered structure in Example 1 and Comparative Examples 1 and 2.

The present invention will now be described in detail.

First, the present invention is based on the idea that because gold and platinum are chemically stable and have excellent weather resistance, chemical resistance, oxidation resistance, etc., the chemical stability of the surface of silver microparticles can be improved by coating the same with gold or platinum only or a compound of gold and platinum. Moreover, the above-mentioned transparent conductive layer is obtained by applying a coating liquid for forming a transparent conductive layer on a transparent substrate and a successive heat treatment, as previously mentioned. In addition, the present invention was completed based on the discovery that when the content ratio of gold and/or platinum in noble metal-coated silver microparticles in a coating liquid for forming a transparent conductive layer is set within a range exceeding 50 wt % to 95 wt %, weather resistance, ultraviolet ray resistance, chemical resistance, etc., of the noble metal microparticles that are obtained will rarely deteriorate, even if an alloyed layer is formed in part of the noble metal coating layer depending on what the above-mentioned heat treatment conditions are.

That is, the present invention is a transparent conductive layered structure comprising a transparent substrate and a transparent conductive layer and a transparent coating layer formed in succession on said transparent substrate, wherein the main components of said transparent conductive layer are noble metal microparticles made from gold and/or platinum and silver with a mean particle diameter of 1 to 100 nm and a gold and/or platinum content within a range exceeding 50 wt % up to 95 wt % and binder matrix.

Moreover, weather resistance, ultraviolet ray resistance and chemical resistance, etc., of the noble metal microparticles in the transparent conductive layer of this transparent conductive layered structure are markedly improved. For example, when a transparent conductive layer consisting of silver microparticles and binder matrix whose main component is silicon oxide is immersed in 5% brine, the chlorine ions in the brine reacts with the silver microparticles in the transparent conductive layer. As a result, marked deterioration within a short time of less than 1 hour is seen and the film of the transparent conductive layer even peels off. In contrast to this, there is no change whatsoever in the transparent conductive layer, even after immersion for 24 hours or longer, showing that weather resistance is excellent, in the case of a transparent conductive layer that has been formed using a coating liquid for forming a transparent conductive layer whose main component is noble metal-coated silver microparticles wherein the surface of the silver microparticles are coated with gold or platinum only or a compound of gold and platinum and containing the gold and/or platinum content within a range exceeding 50 wt % up to 95 wt %. Furthermore, since gold and platinum do not oxidize in the atmosphere, there also is no deterioration of electrical resistance due to oxidation induced by oxygen radicals, etc., during exposure to ultraviolet rays of the noble metal microparticles that were formed from the above-mentioned noble metal-coated silver microparticles and that have a gold and/or platinum content within a range exceeding 50 wt % up to 95 wt %. Consequently, oxidation resistance of a transparent conductive layer comprising noble metal microparticles whose gold and/or platinum content is within a range exceeding 50 wt % up to 95 wt % is better than that of conventional transparent conductive layers that use silver microparticles as is, or comprising noble metal microparticles with a content ratio of gold and/or platinum of 50 wt % or less. In addition, with the present invention, the content ratio of gold and/or platinum exceeds 50 wt % and there is a corresponding formal reduction in the weight ratio of silver in the noble metal microparticles. However, since the atomic weight of silver is approximately half that of gold and platinum, there is not such a large reduction in the ratio of silver when compared in terms of the molar % and the contribution of the silver to the properties of the noble metal microparticles can of course be maintained.

Next, specific resistance of platinum is somewhat higher than that of silver and gold, as previously mentioned, and therefore, the method of using noble metal microparticles made from silver and gold is more effective in reducing the surface resistance of the above-mentioned transparent conductive layer of the present invention than noble metal microparticles made from silver and platinum or noble metal microparticles made from silver, platinum and gold. However, since the majority of the gold or platinum only or the compound material of gold and platinum is used as coating layer on the surface of the above-mentioned silver microparticles, the good electrical conductivity of the silver is not lost to such an extent that it falls below the level needed for practical application, even if some of this gold and/or platinum is used as an alloy with the silver. Consequently, the microparticles of the present invention are not limited to noble metal microparticles made from silver and gold, and noble metal microparticles that are made of silver and platinum, or noble metal microparticles made from silver and platinum and gold can also be used.

In the present specification, the microparticles constituted of silver, gold, etc. in the coating liquid used to form a transparent conductive layer are represented as noble metal-coated silver particles and the microparticles constituted of silver, gold, etc. in the transparent conductive layer are differentiated from noble metal microparticles for the following reasons. That is, in contrast to the fact that the noble metal coating layer that coats the surface of the silver microparticles in the coating liquid for forming a transparent conductive layer are made from only gold and/or platinum, there are cases wherein the noble metal coating layer that coats the surface of the silver microparticles by formation of an alloyed layer depending on the above-mentioned heat treatment conditions in the transparent conductive layer is not limited to being made from gold and/or platinum only. Consequently, the microparticles constituted of silver, gold, etc. contained in the transparent conductive layer are not represented as noble metal-coated silver microparticles, but are instead represented as noble metal microparticles made from gold and/or platinum and silver.

Here, the above-mentioned noble metal-coated silver microparticles should have a mean particle diameter of 1 to 100 nm. When it is less than 1 nm, it will be difficult to produce these microparticles, and they will also readily aggregate in the coating liquid, making such microparticles impractical. Moreover, if mean particle diameter exceeds 100 nm, visible light ray transmittance of the formed transparent conductive layer will be too low. Even if a thinner film is designed in order to improve visible light ray transmittance, surface resistance will be too high and the particles will be impractical. The mean particle diameter as used here means the mean particle diameter of microparticles observed under a transmission electron microscope (TEM).

Next, the content ratio of gold or platinum only or of a compound of gold and platinum coating the surface of the above-mentioned noble metal-coated silver microparticles should be set to within a range exceeding 50 wt % up to 95 wt %, and should preferably be set at 60 wt % to 90 wt %. If the amount of coating with gold or platinum only, or compound of gold and platinum, is 50 wt % or less, there are cases where the protective effects of the coating will be weakened and weather resistance will become somewhat poor when some of the noble metal-coated silver microparticles are alloyed by heat treatment, while exceeding 95 wt % is prohibitive in terms of cost.

One type or more of conductive oxide microparticles selected from tin oxide, tin antimony oxide and indium tin oxide can be added to the transparent conductive layer for the purpose of improving film transmittance and film strength in the transparent conductive layer. The mixture ratio of noble metal microparticles and conductive oxide microparticles in the transparent conductive layer should be set to within a range of 1 to 200 parts by weight, preferably 10 to 100 parts by weight, conductive oxide microparticles, based on 100 parts by weight noble metal microparticles. If the amount of conductive oxide microparticles that is mixed is less than 1 part by weight, adding the conductive oxide microparticles will have no effect and is therefore impractical, while if it exceeds 200 parts by weight, resistance of the transparent conductive layer will be too high, which is also impractical. In addition, as with the noble metal microparticles, mean diameter of the conductive oxide microparticles is preferably 1 to 100 nm.

Next, the coating liquid for forming a transparent conductive layer that is used to form the above-mentioned transparent conductive layer can be produced by the following method.

First, a colloidal dispersion of silver microparticles is prepared by a conventional method (for instance, the Carey-Lea method, Am. J. Sci., 37, 47 (1889), Am J. Sci., 38 (1889)). That is, a mixed solution of aqueous iron sulfate (II) solution and aqueous sodium citrate solution is added to an aqueous silver nitrate solution and reacted, and then the precipitate is filtered and washed and then pure water is added. Thus, a colloidal dispersion of silver microparticles (Ag: 0.1 to 10 wt %) can be easily prepared. The method of preparing a colloidal dispersion of silver microparticles is not limited to this method, and it is possible to use any method as long as silver microparticles with a mean particle diameter of 1 to 100 nm are dispersed. The surface of the above-mentioned silver microparticles can be coated with gold or platinum only, or a compound of gold and platinum by adding reducing agent to the colloidal dispersion of silver microparticles that is obtained, and then further adding alkali metal aurate solution or alkali metal platinate solution, or adding alkali metal platinate solution and alkali metal aurate solution separately, or adding a mixed solution of alkali metal aurate and alkali metal platinate. A colloidal dispersion of noble metal-coated silver microparticles can be obtained in this way.

A trace of dispersant may be added to at least one, or to all of, the colloidal dispersion, alkali metal aurate solution, alkali metal platinate solution, and mixed solution of alkali metal aurate and alkali metal platinate during this process of preparing the noble metal-coated silver microparticles as needed.

The coating reaction of gold or platinum only or compound of gold and platinum on the surface of the silver microparticles occurs during the above-mentioned process of preparing the noble metal-coated silver microparticles here because large amounts of fine silver microparticles are already present in the liquid when gold and platinum are produced by reduction of the aurate and platinate and therefore, growth on the surface with the silver microparticles as the nucleus, rather than nucleation of the gold or platinum only (homogenous nucleation), proceeds under conditions that are advantageous in terms of energy. Consequently, it is a requisite that large amounts of fine silver microparticles be present in the solution when the gold and platinum are produced by reduction of aurate and platinate and therefore, it is desirable that the timing of adding the aurate solution or platinate solution, the platinate solution and aurate solution, or a mixed solution of these, and reducing agent to the colloidal dispersion of above-mentioned silver microparticles be as follows: That is, it is preferred that the reducing agent is added earlier than or simultaneously with addition of the aurate solution or platinate solution, the aurate solution and platinate solution, or their mixed solution. This is because, when the reducing agent is added, in a mixed state with aurate solution or platinate solution, or with aurate solution and platinate solution, or with mixed solution of aurate and platinate, to the colloidal dispersion of silver microparticles, gold and platinum are produced by reduction of aurate and platinate during the step wherein the reducing agent is mixes with the aurate solution or platinate solution, with aurate solution and platinate solution, or with mixed solution of aurate and platinate, and nucleation of the gold and platinum alone (homogenous nucleation) occurs. Therefore, even if the aurate solution, platinate solution, etc., are added to the colloidal dispersion of silver microparticles after being mixed with reducing agent, a coating reaction of gold or platinum only, or a compound of gold and platinum, on the silver microparticle surface will not take place.

Furthermore, hydrazine ($N_2H_4$), borohydrates such as sodium borohydrate ($NaBH_4$), etc., formaldehyde, etc., can be used as the above-mentioned reducing agent, but the reducing agent is not limited to these and any can be used as long as it does not cause aggregation of the silver microparticles, and can reduce the aurate and platinate to gold and platinum when it is added to the colloidal dispersion of silver microparticles.

For instance, the reduction reaction when potassium aurate [$KAu(OH)_4$] and potassium platinate [$K_2Pt(OH)_6$] are reduced by hydrazine or sodium borohydrate are each shown below:

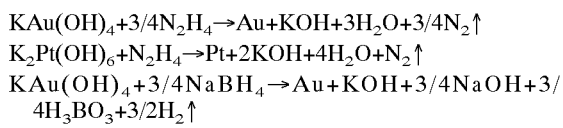

$KAu(OH)_4 + 3/4 N_2H_4 \rightarrow Au + KOH + 3H_2O + 3/4 N_2\uparrow$ $K_2Pt(OH)_6 + N_2H_4 \rightarrow Pt + 2KOH + 4H_2O + N_2\uparrow$ $KAu(OH)_4 + 3/4 NaBH_4 \rightarrow Au + KOH + 3/4 NaOH + 3/4 H_3BO_3 + 3/2 H_2\uparrow$ $K_2Pt(OH)_6 + NaBH_4 \rightarrow Pt + 2KOH + NaOH + H_3BO_3 + 2H_2\uparrow$ Here, when the above-mentioned sodium borohydrate is used as the reducing agent, there is an increase in the concentration of electrolytes produced by the reduction reaction, as can be seen from the above-mentioned reaction formula, and therefore, microparticles will easily aggregate, as mentioned later. The amount of reducing agent is thereby limited and there is a disadvantage in that the silver concentration of the colloidal dispersion of silver microparticles that is used cannot be made high.

On the other hand, when the above-mentioned hydrazine is used as the reducing agent, little electrolyte is produced by the reduction reaction, as can be confirmed by the above-mentioned reaction formula, and therefore, it is a preferable reducing agent.

Incidentally, when salts other than alkali metal aurate or alkali metal platinate, such as chloroauric acid ($HAuCl_4$), chloroplatinic acid ($H_2PtCl_6$), or chloroaurates ($NaAuCl_4$, $KAuCl_4$, etc.), or chloroplatinates ($Na_2PtCl_6$, $K_2PtCl_6$, etc.) are used as the gold and platinum coating starting materials, the reduction reaction by hydrazine is as follows:

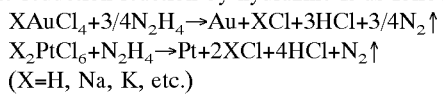

$XAuCl_4 + 3/4 N_2H_4 \rightarrow Au + XCl + 3HCl + 3/4 N_2\uparrow$ $X_2PtCl_6 + N_2H_4 \rightarrow Pt + 2XCl + 4HCl + N_2\uparrow$ (X=H, Na, K, etc.)

Thus, when chloroplatinic acid, etc., are used, not only is the electrolyte concentration increased due to the reduction reaction, but chlorine ions are also produced when compared to the case where the above-mentioned aurate or platinate is used and therefore, these react with the silver microparticles to form a silver chloride which is hardly soluble. Consequently, they are difficult to use as the starting material for forming the transparent, conductive layer of the present invention.

The colloidal dispersion of noble metal-coated silver microparticles obtained in this way preferably should then be subjected to desalting treatment, such as dialysis, electrodialysis, ion exchange, ultrafiltration, etc. so as to lower its electrolyte concentration. This is because colloids generally aggregate with electrolytes when the electrolyte concentration is high. This phenomenon is known as the Schulze-Hardy rule. Furthermore, for the same reasons, it is preferred that this desalting be thoroughly performed on conductive oxide microparticles and their dispersions as well when conductive oxide microparticles selected from tin oxide, tin antimony oxides, or indium tin oxides are added to the above-mentioned colloidal dispersion of noble metal-coated silver particles or coating liquid for forming a transparent conductive layer.

Next, a concentrated dispersion of noble metal-coated silver microparticles is obtained by concentration of the colloidal dispersion of noble metal-coated silver microparticles that have been treated by desalting and a coating liquid for forming a transparent conductive layer is obtained by adding organic solvent only, or organic solvent comprising conductive oxide microparticles and/or inorganic binder, to this concentrated dispersion of noble metal-coated silver microparticles and adjusting the components (microparticle concentration, water content, etc.). When ultrafiltration is used as the desalting treatment method, desalting and concentration can be performed simultaneously because this ultrafiltration acts as a concentration treatment, as is described below. Thus, it is possible to set the order of desalting and concentration of the colloidal dispersion in which noble metal-coated silver microparticles are dispersed as needed based on the treatment system that is used, and if ultrafiltration, etc., are employed, simultaneous treatment is also possible.

The foundation for coating the surface of silver microparticles with gold or platinum alone or a compound of gold and platinum to obtain noble metal-coated silver microparticles in the coating liquid for forming a transparent conductive layer is technically confirmed by the fact that there is almost no change in particle diameter before and after coating of gold or platinum only or a compound of gold and platinum, and distribution of gold or platinum only or of a compound of gold and platinum is uniform for each particle in particle observation under a transmission electron microscope (TEM) and component analysis (EDX: energy dispersive X-ray analyzer), and further, from the coordination number of the gold or platinum alone or of a compound of gold and platinum by EXAFS (Extended X-ray Absorption Fine Structure) analysis.

In addition, the coated form of the gold and platinum compound on the silver microparticles varies depending on whether an aurate solution and platinate solution were used or a mixed solution of aurate and platinate was used during the gold and platinum compound coating process (that is, the process of preparing noble metal-coated silver microparticles), depending on the timing when this mixed solution was added and the concentration of aurate and platinate that was used, etc. That is, depending on these conditions, a form is obtained wherein all or part of the surface of the silver particles is coated with gold, and this is further completely coated with platinum, or vice-versa, all or part of the surface of the silver particles is coated with platinum, and this is further completely coated with gold, or the entire surface of the silver microparticles is coated with each of platinum and gold alone or in an alloyed state without any overlapping.

In addition, concentration of the colloidal dispersion of the above-mentioned noble metal-coated silver microparticles can be accomplished by any normal method, such as the use of a reduced-pressure evaporator, ultrafiltration, etc. The water concentration in the coating liquid for forming a transparent conductive layer is 1 to 50 wt %, preferably 5 to 20 wt %. This is because if it exceeds 50 wt %, cissing due to the high surface tension of the water may readily occur during drying once this coating liquid for forming a transparent conductive layer on a transparent substrate has been applied.

The above-mentioned cissing problem can be solved by adding surfactant to the coating liquid for forming a transparent conductive layer. However, the addition of the surfactant my cause another problem that coating defects easily occur. Thus, the water content of the coating liquid for forming a transparent conductive layer is preferably 1 to 50 wt %.

In addition, there are no special restrictions to the above-mentioned organic solvent, and it is selected as needed based on the application method and film-production conditions. Examples are alcohol solvents, such as methanol, ethanol, ispropanol, butanol, benzyl alcohol, diacetone alcohol, etc., ketone solvents such as acetone, methyl ethyl ketone (MEK), methyl isobutyl ketone (MIBK), cyclohexanone, isophorone, etc., glycol derivatives, such as propylene glycol methyl ether, propylene glycol ethyl ether, etc., acetonitrile, formamide, N-methyl formamide, dimethyl formamide (DMF), dimethyl sulfoxide (DMSO), N-methyl-2-pyrrolidone (NMP), etc., but the solvent is not limited to these examples.

Next, a transparent conductive layered structure having a transparent substrate, a transparent conductive layer formed on said transparent substrate whose main components are noble metal microparticles with a mean particle diameter of 1 to 100 nm and a binder matrix, and a transparent coating layer formed on top of this can be obtained using the coating liquid for forming a transparent conductive layer obtained in this way.

Moreover, the following method can be used to form a transparent 2-layer film made from the transparent conductive layer and transparent coating layer on the transparent substrate. That is, a coating liquid for forming a transparent conductive layer whose main components are solvent and noble metal-coated silver particles with a mean particle diameter of 1 to 100 nm is applied by any method, such as spray coating, spin coating, wire bar coating, doctor blade coating, etc., to a transparent substrate, such as a glass substrate, plastic substrate, etc., and when necessary, after drying, overcoating with, for instance, a coating liquid for forming a transparent coating layer whose main component is silica sol, etc., is performed by the above-mentioned method.

Next, after overcoating, heat treatment is performed at a temperature of, for instance, 50 to 350° C., and the transparent coating layer that was overcoated is cured to form the above-mentioned 2-layer film. Furthermore, there is no problem with heat treatment at 50 to 350° c. because the noble metal-coated silver microparticles are protected by the gold or platinum only or the compound of gold and platinum, but when the silver microparticles used in conventional methods exceeded 200° C., surface resistance rose and film deterioration occurred due to oxidative diffusion.

Improvement of conductivity, improvement of strength, and even further improvement of weather resistance are simultaneously realized here when the coating liquid for forming a transparent coating layer whose main component is silica sol, etc., is overcoated by the above-mentioned methods because the silica sol liquid that has been overcoated (this silica sol liquid becomes the binder matrix whose main component is silicon oxide with the above-mentioned heat treatment) soaks into the spaces in the noble-metal-coated silver microparticle layer that was formed by pre-application of coating liquid for forming a transparent conductive layer whose main components are solvent and noble metal-coated silver microparticles.

Figure 2:
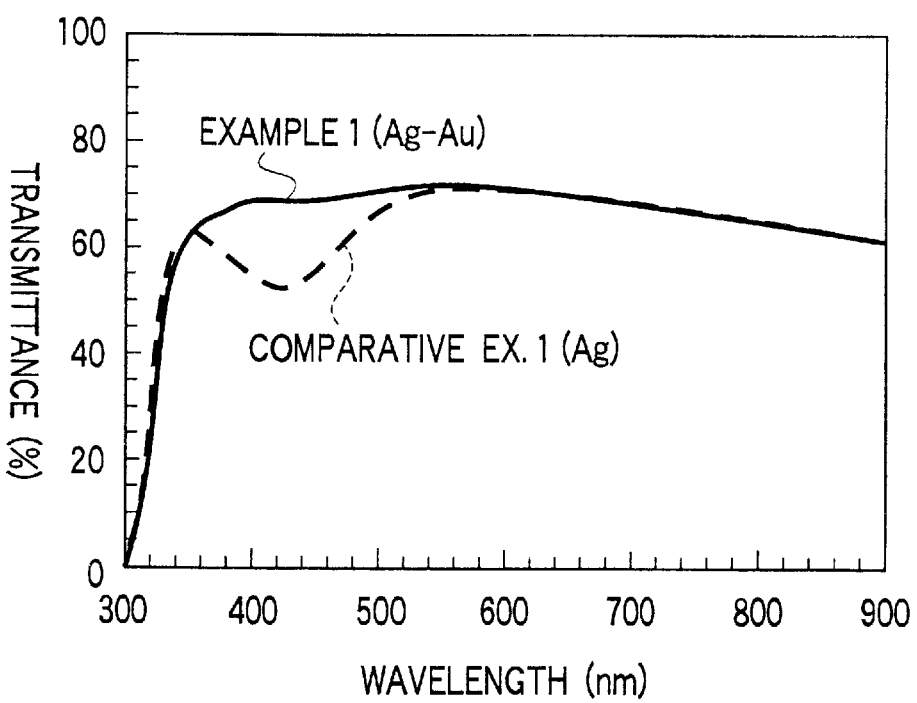
FIG. 2 is a graph showing the transmission profile of the transparent conductive layered structure in Example 1 and Comparative Example 1.

Moreover, refractive index n of the above-mentioned optical constant (n−ik) of the transparent conductive layer wherein noble metal microparticles are dispersed in a binder matrix whose main component is silicon oxide is not very large, but the extinction coefficient k is high and therefore, the reflectance of the transparent 2-layer film can be markedly reduced by the above-mentioned transparent 2-layer structure film of transparent conductive layer and transparent coating layer. Moreover, as shown in FIG. 1, when noble metal microparticles made from gold and silver are used (Example 1), reflectance in the short wavelengh region (380 to 500 nm) of visible light is improved when compared to the case where ITO microparticles are used (Comparative Example 2) and silver microparticles (Comparative Example 1) are used. In addition, the transmission profile of the transparent 2-layer film can be improved in the short wavelength region of visible light rays, as shown in FIG. 2, by using noble-metal microparticles made from gold and silver. For instance, when the standard deviation of the transmittance of the transparent 2-layer film only without the transparent substrate is compared at each wavelength in 5 nm intervals in the visible light ray wavelength region (380 to 780 nm), it was 7% when silver microparticles were used (Comparative Example 1), but it was small at 1 to 3% when noble metal microparticles made of gold and/or platinum and silver were used (Examples 1 through 9) and an extremely flat transmission profile is obtained. The reason for the improvement in these reflection and transmission properties of the transparent 2-layer film is unclear, but it appears that there are changes in the surface plasmon of the metal microparticles because the silver microparticles have been coated with or comprise gold or platinum only or a compound of gold and platinum.

A polymer obtained by adding water or acid catalyst to orthoalkyl silicate for hydrolysis and then promoting dehydropolycondensation, or a polymer obtained by further promoting hydrolysis and dehydropolycondensation of a commercial alkyl silicate solution already hydrolyzed and promoted through polycondensation up to a tetramer or pentamer, etc., can be used as the above-mentioned silica sol. Furthermore, when dehydropolycondensation is promoted, the solution viscosity rises until it finally solidifies and therefore, the degree of dehdyropolycondensation is adjusted to the upper viscosity limit with which application to a transparent substrate, such as a glass substrate, plastic substrate, etc., is possible or lower. There are no particular specifications for the degree of dehydropolycondensation as long as it is at the level of the above-mentioned upper viscosity limit or lower, but taking into consideration film strength, weather resistance, etc., 500 to 3,000 in terms of the weight-average molecular weight is preferred. Moreover, the alkyl silicate hydrolyzed polymer forms a cured silicate film (film whose main component is silicon oxide), with the dehydropolycondensation reaction all but completed, during heating and baking of the transparent 2-layer film. Furthermore, the refractive index of the transparent coating layer can be adjusted to change the reflectance of the transparent 2-layer film by adding magnesium fluoride microparticles, alumina sol, titania sol, zirconia sol, etc., to the above-mentioned silica sol.

In addition, the above-mentioned coating liquid for forming the above-mentioned transparent conductive layer can be made by mixing a silica sol liquid as the inorganic binder component that makes up the binder matrix of the transparent conductive layer in addition to the solvent and the noble metal-coated silver microparticles with an mean particle diameter of 1 to 100 nm dispersed in this solvent. In this case also, the same above-mentioned transparent 2-layer film consisting of a transparent conductive layer and a transparent coating layer is obtained by applying the coating liquid for forming a transparent conductive layer comprising silica sol liquid and when necessary, after drying, overcoating a coating liquid for forming the transparent coating layer by the above-mentioned method. Furthermore, it is preferred that thorough desalting of the above-mentioned silica sol liquid to be added to the coating liquid for forming a transparent conductive layer be performed for the same reasons as in the case where conductive oxide microparticles are mixed in the coating liquid for forming a transparent conductive layer.

Thus, with the transparent conductive layered structure of the present invention, the main components of the above-mentioned transparent conductive layer of the transparent 2-layer film consisting of a transparent conductive layer and transparent coating layer formed in succession on a transparent substrate are noble metal microparticles made from gold and/or platinum and silver with a mean particle diameter of 1 to 100 nm, with the gold and/or silver content being within a range exceeding 50 wt % up to 95 wt % and therefore, the transparent conductive layered structure of the present invention has excellent anti-reflection activity and transmission profile when compared to conventional transparent conductive layered structures, and it has good weather resistance and ultraviolet ray resistance and high electric field-shielding activity.

Thus, it can be used as the front panel, etc., of displays, such as CRTs, plasma display panels (PDPs), fluorescent displays (VFDs), field emission displays (FEDs), electroluminescence displays (ELDS) and liquid crystal displays (LCDs).

Further, with the coating liquid for forming a transparent conductive layer of the present invention, the main components thereof are solvent and noble metal-coated silver microparticles dispersed in this solvent with an mean particle diameter of 1 to 100 nm, wherein the surface of the silver microparticles is coated with gold or platinum only or a compound of gold and platinum and the gold and/or platinum content is within a range exceeding 50 wt % up to 95 wt %. Therefore, when compared to transparent conductive layers that use conventional coating liquid for forming a transparent conductive layer, the coating liquid of the present invention has the effect of being able to form a transparent conductive layer with good anti-reflection performance and electric field-shielding performance and a good transmission profile in the visible light region and weather resistance and ultraviolet ray resistance.

Consequently, it is possible to obtain a transparent conductive layered structure that can be used for the front panel, etc., in CRT, PDP, LCD, etc., displays by forming the above-mentioned transparent conductive layer using this coating liquid for forming a transparent conductive layer.

Examples of the present invention will now be explained in the concrete, but the present invention is not limited to these examples. Moreover, the "%" in this text are "t%" with the exception of the (%) used for transmittance, reflectance and haze, and the "arts" are "arts by weight"

EXAMPLE 1

A colloidal dispersion of silver microparticles was prepared by the above-mentioned Carey-Lea method. In the concrete, after adding a mixed solution of 39 g aqueous 23% iron sulfate (II) solution and 48 g aqueous 37.5% sodium citrate solution to 33 g aqueous 9% silver nitrate solution, the precipitate was filtered and washed. Then pure water was added to prepare a colloidal dispersion of silver microparticles (Ag: 0.15%). Next, 8.0 g aqueous 1% hydrazine monohydrate ($N_2H_4 \cdot H_2O$) were added to 110 g of this colloidal dispersion of silver microparticles and then a mixed solution of 480 g aqueous potassium aurate [$KAu(OH)_4$] solution (Au: 0.075%) and 0.27 g aqueous 1% polymer dispersant solution were added while agitating to obtain a colloidal dispersion of noble-metal coated silver microparticles that were coated with gold only.

Once desalting of this colloidal dispersion of noble metal-coated silver microparticles was performed with an ion-exchange resin (Diaion SKLB, SA20AP; brand names of Mitsubishi Chemical Corportion), the product was concentrated by ultrafiltration. Ethanol was added to this concentrated liquid to obtain a coating liquid for forming a transparent conductive layer containing noble metal-coated silver microparticles (Ag: 0.141%, Au: 0.309%, water: 12.1%, EA: 87.45%).

As a result of observing this coating liquid for forming a transparent conductive layer under a transmission electron microscope, the mean particle diameter of the noble metal-coated silver microparticles was 8.2 nm. The content ratio of gold in the noble metal-coated silver microparticles was 68.7 wt % from the composition ratio of the above-mentioned coating liquid for forming the above-mentioned transparent conductive layer.

Next, the coating liquid for forming a transparent conductive layer comprising noble metal-coated silver microparticles was spin coated (130 rpm, 60 seconds) onto a glass substrate (soda lime glass with a-thickness of 3 mm) that had been heated to 40° C. and then silica sol liquid was spin coated (150 rpm, 60 seconds) and the product was further cured for 20 minutes at 210° C. to obtain a glass substrate with a transparent 2-layer film made from a transparent conductive layer containing noble metal microparticles consisting of silver and gold and a transparent coating layer consisting of silicate film whose main component is silicon oxide, that is, the transparent conductive layered structure of Example 1.

The above-mentioned silica sol liquid here is obtained by preparing a substance with an $SiO_2$ (silicon oxide) solid content concentration of 10% and a weight-average molecular weight of 2,850 using 19.6parts Methyl Silicate 51 (Colcoat Co., Ltd., brand name), 57.8 parts ethanol, 7.9 parts aqueous 1% nitric acid solution, and 14.7 parts pure water and then diluting this with a mixture of isopropyl alcohol (IPA) and n-butanol (NBA) (IPA/NBA=3/1) to a final $SiO_2$ solid content concentration of 0.75%.

Figure 3:
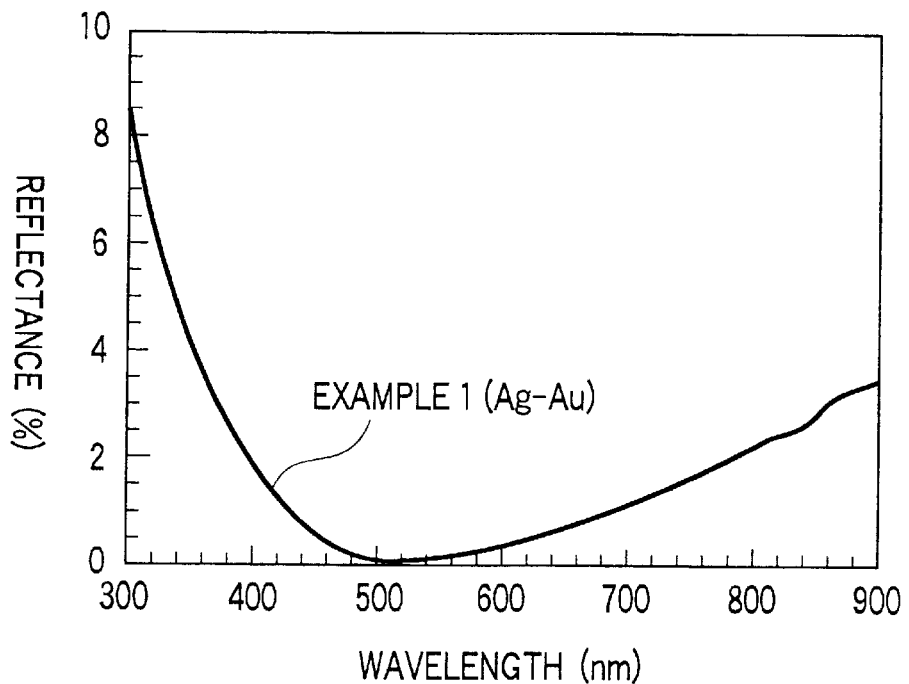
FIG. 3 is a graph showing the reflection profile of the transparent conductive layered structure in Example 1.
Figure 4:
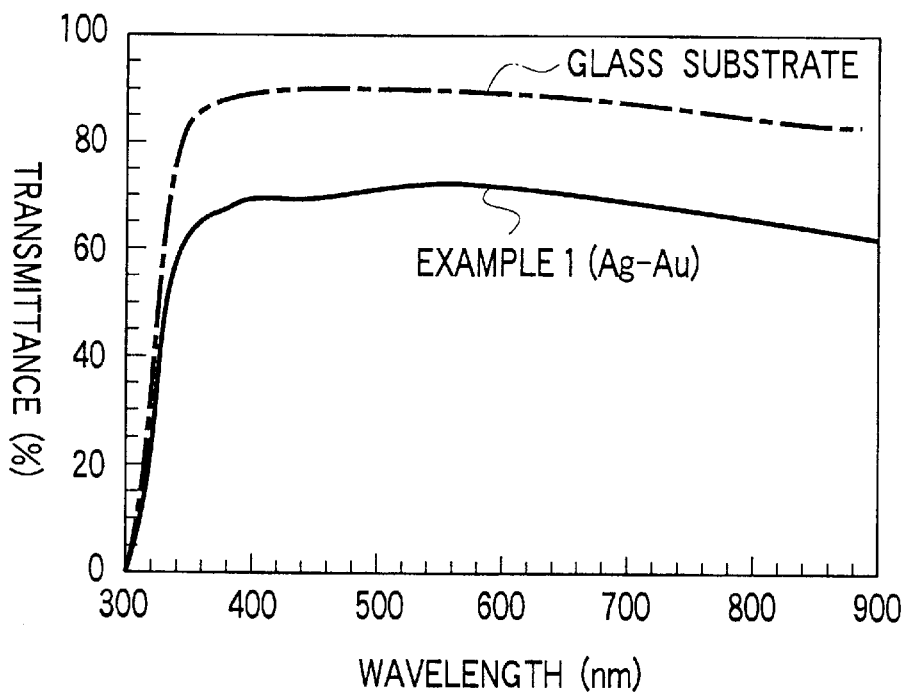
FIG. 4 is a graph showing the transmission profile of the transparent conductive layered structure in Example 1 and the glass substrate that is a structural material of this layered structure.

Moreover, film properties of the transparent 2-layer film formed on the glass substrate (surface resistance, visible light ray transmittance, standard deviation of transmittance, haze value, bottom resistivity/bottom wavelength) are shown in Table 1. Furthermore, above-mentioned bottom reflectance means minimum reflectance in the reflection profile of the transparent conductive layered structure, and bottom wavelength means the wavelength when reflectance is at its minimum. Moreover, the reflection profile of the transparent conductive layered structure of Example 1 that was produced is shown in FIGS. 1 and 3, while the transmission profile is shown in FIGS. 2 and 4.

Furthermore, transmittance of the transparent 2-layer film only without the transparent substrate (glass substrate) at each wavelength in 5 nm intervals of the visible light ray wavelength region (380 to 780 nm) in Table 1 is found as follows: That is, Transmittance of transparent 2-layer film only without transparent substrate (%)=[(transmittance determined inclusive of transparent substrate)/(transmittance of transparent substrate)]×100

Unless otherwise noted, here the value that was determined inclusive of the transparent substrate (that is, the above-mentioned transparent conductive layered structure is meant by the transparent 2-layer film including the transparent substrate) is used as the transmittance in the present Specification.

Moreover, surface resistance of the transparent 2-layer film was determined using the surface resistance meter Loresta AP (MCP-T400) of Mitsubishi Chemical Corportion. The haze value and visible light ray transmittance were determined inclusive of the transparent substrate using a haze meter (HR-200) made by Murakami Color Research Laboratory. Reflectance and the reflection and transmission profiles were determined using a spectrophotometer (U-4000) made by Hitachi Ltd. In addition, particle diameter of the noble metal-coated silver microparticles is as evaluated under a transmission electron microscope made by JEOL Ltd.

EXAMPLE 2

Other than the fact that the ethanol dilution ratio of the liquid concentrated by ultrafiltration was varied, the same treatment as in Example 1 was performed using the colloidal dispersion of noble metal-coated silver microparticles prepared in Example 1 to obtain a coating liquid for forming a transparent conductive layer of Example 2 in which were dispersed noble metal-coated silver microparticles with a mean particle diameter of 8.2 nm (Ag: 0.1%, Au: 0.219%, water: 8.6%, EA: 91.0%).

Furthermore, the content ratio of gold in the noble metal-coated silver microparticles was 68.7 wt % from the composition ratio of the above-mentioned coating liquid for forming a transparent conductive layer.

In addition, other than the fact that this coating liquid for forming a transparent conductive layer was used, a glass substrate with a transparent 2-layer film made from a transparent conductive layer containing noble metal microparticles consisting of silver and gold and a transparent coating layer consisting of silicate film whose main component was silicon oxide, that is, the transparent conductive layered structure of Example 2 was obtained as in Example 1.

Figure 5:
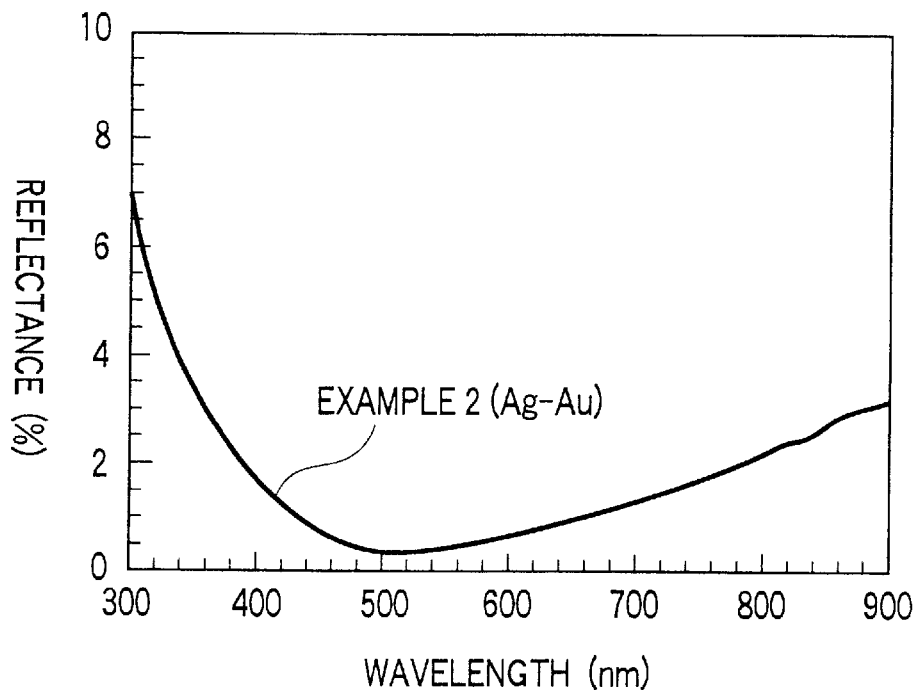
FIG. 5 is a graph showing the reflection profile of the transparent conductive layered structure in Example 2.
Figure 6:
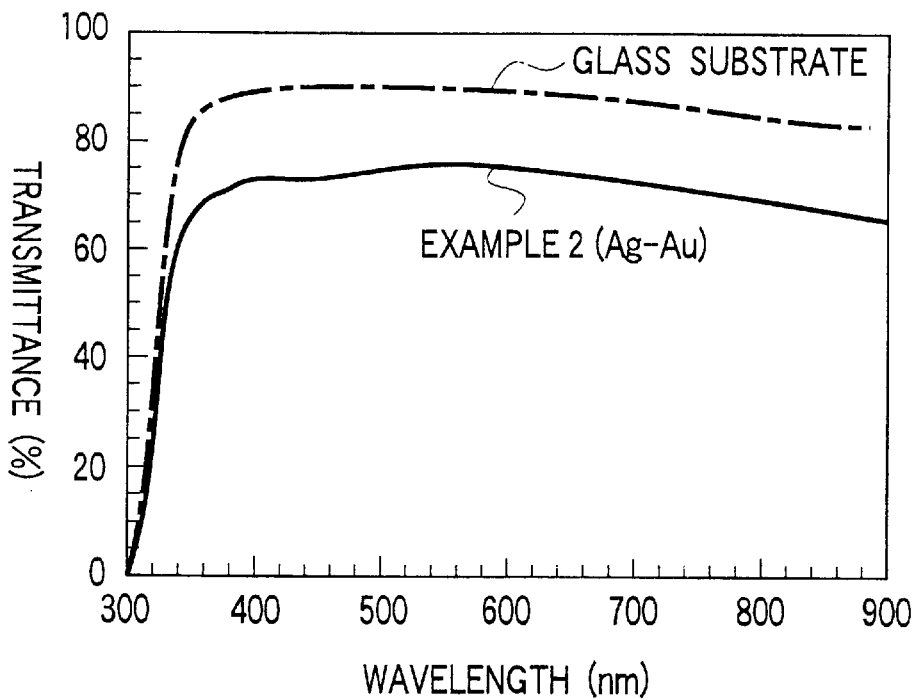
FIG. 6 is a graph showing the transmission profile of the transparent conductive layered structure in Example 2 and the glass substrate that is a structural material of this layered structure.

The film properties of the transparent 2-layer film that was formed on the glass substrate are shown in the following Table 1. Furthermore, the reflection profile of the transparent conductive layered structure of Example 2 that was produced is shown in FIG. 5 and the transmission profile is shown in FIG. 6.

EXAMPLE 3

The same treatment as in Example 1 was performed using 83 g of a colloidal dispersion of silver microparticles prepared by the same method as in Example 1 and using 9.0 g of an aqueous 1% hydrazine monohydrate ($N_2H_4.H_2O$) solution and 540 g of an aqueous potassium aurate solution (Au: 0.075%) to obtain a coating liquid for forming a transparent conductive layer in which were dispersed noble metal-coated silver microparticles with a mean particle diameter of 8.4 nm (Ag: 0.093%, Au: 0.307%, water: 10.7%, EA: 88.9%).

Furthermore, the content ratio of gold in the noble metal-coated silver microparticles was 76.8 wt % from the composition ratio of the above-mentioned coating liquid for forming a transparent conductive layer.

Moreover, other than the fact that this coating liquid for forming a transparent conductive layer was used, a glass substrate with a transparent 2-layer film made from a transparent conductive layer containing noble metal microparticles consisting of silver and gold and a transparent coating layer consisting of silicate film whose main component is silicon oxide, that is, the conductive transparent layered structure of Example 3, was obtained as in Example 1.

Figure 7:
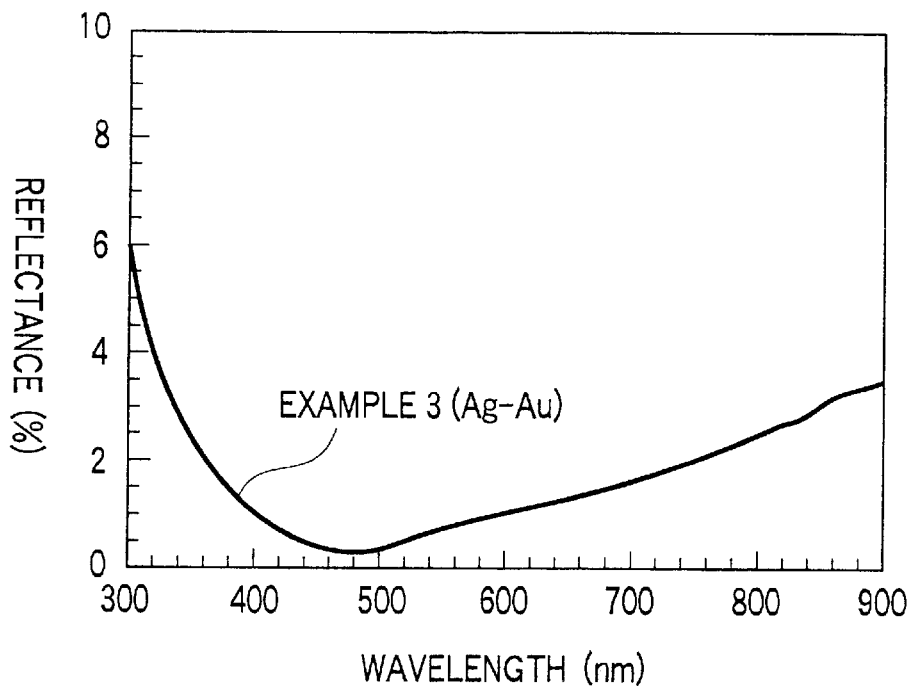
FIG. 7 is a graph showing the reflection profile of the transparent conductive layered structure in Example 3.
Figure 8:
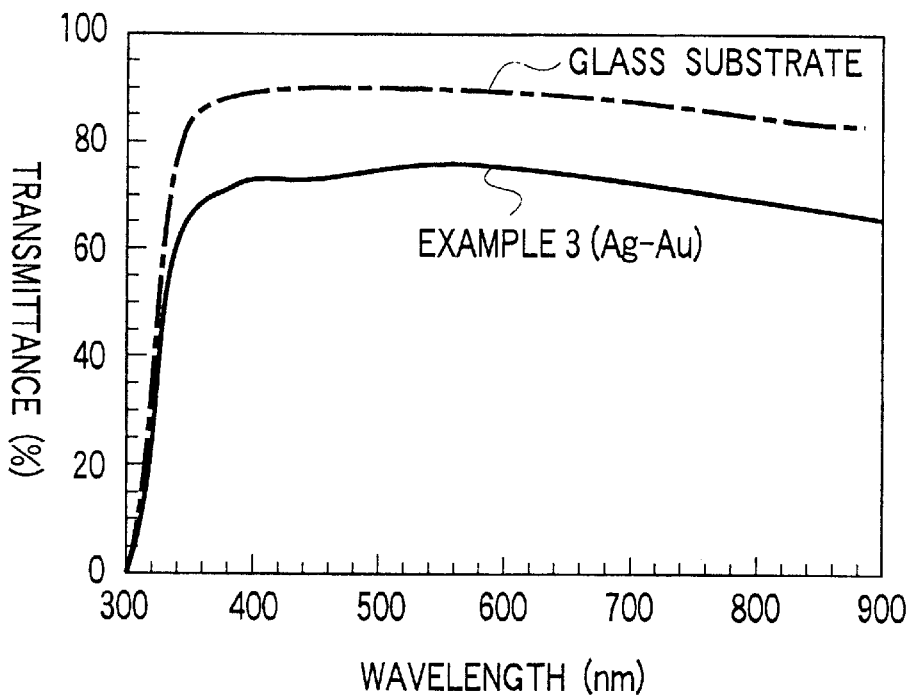
FIG. 8 is a graph showing the transmission profile of the transparent conductive layered structure in Example 3 and the glass substrate that is a structural material of this layered structure.

The film properties of the transparent 2-layer film formed on the glass substrate are shown in Table 1 below. Moreover, the reflection profile of the transparent conductive layered structure in Example 3 is shown in FIG. 7 and the transmission profile is shown in FIG. 8.

EXAMPLE 4

The same treatment as in Example 1 was performed using 62 g of a colloidal dispersion of silver microparticles prepared by the same method as in Example 1 and using 9.0 g of an aqueous 1% hydrazine monohydrate ($N_2H_4 \cdot H_2O$) solution and 540 g of an aqueous potassium aurate solution (Au: 0.075%) to obtain a coating liquid for forming a transparent conductive layer in which were dispersed noble metal-coated silver microparticles with a mean particle diameter of 8.6 nm (Ag: 0.074%, Au: 0.326%, water: 10.7%, EA: 88.9%).

Furthermore, the content ratio of gold in the noble metal-coated silver microparticles was 81.5 wt % from the composition ratio of the above-mentioned coating liquid for forming a transparent conductive layer.

Moreover, other than the fact that this coating liquid for forming a transparent conductive layer was used, the same treatment as in Example 1 was performed to obtain a glass substrate with a transparent 2-layer film made from a transparent conductive layer containing noble metal microparticles consisting of silver and gold and a transparent coating layer consisting of silicate film whose main component is silicon oxide, that is, the conductive transparent layered structure of Example 4.

The film properties of the transparent 2-layer film formed on the glass substrate are shown in Table 1 below.

EXAMPLE 5

A solution in which noble metal-coated silver microparticles with a mean particle diameter of 8.2 nm were dispersed was obtained by the same method as in Example 1.

Next, ITO dispersion that had been obtained by using indium tin oxide (ITO) microparticles with a mean particle diameter of 0.03 $\mu$m (SUFP-HX, brand name of Sumitomo Metal Mining Co., Ltd) and by thorough desalting by ion-exchange was added to this solution to eventually obtain a coating liquid for forming a transparent conductive layer in which were dispersed noble metal-coated silver microparticles and ITO microparticles (Ag: 0.113%, Au: 0.247%, ITO: 0.036%, water: 10.8%, EA: 88.0%).

The content ratio of gold in the noble metal-coated silver microparticles was 68.6 wt % from the composition ratio of the above-mentioned coating liquid for forming a transparent conductive layer.

Further, other than the fact that this coating liquid for forming a transparent conductive layer was used, the same treatment as in Example 1 was performed to obtain a glass substrate having a transparent 2-layer film made from a transparent conductive layer containing noble metal microparticles consisting of silver and gold and ITO microparticles and a transparent coating layer consisting of silicate film whose main component is silicon oxide, that is, the conductive transparent layered structure of Example 5.

Figure 9:
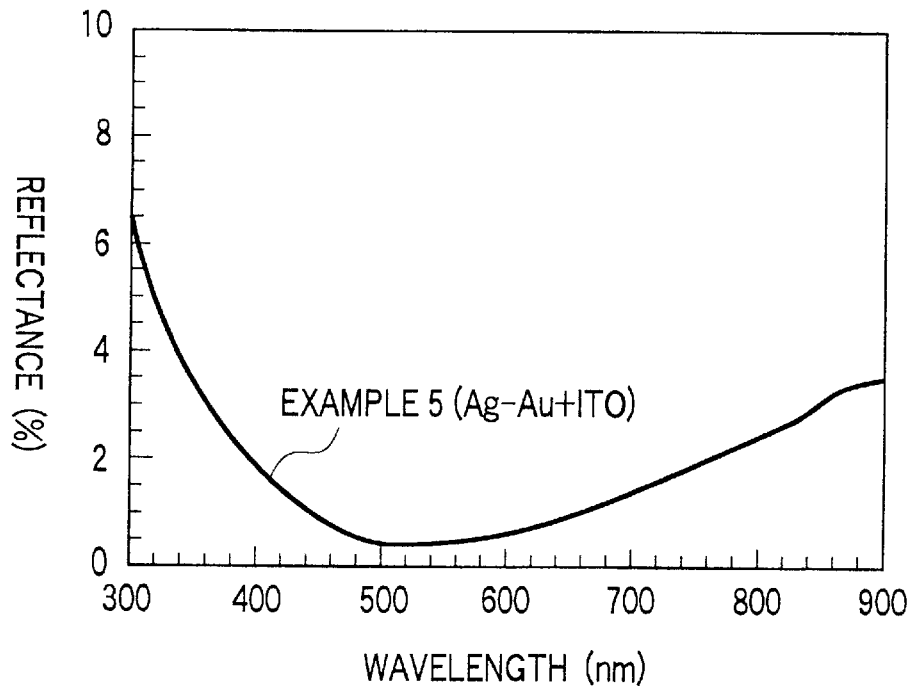
FIG. 9 is a graph showing the reflection profile of the transparent conductive layered structure in Example 5.
Figure 10:
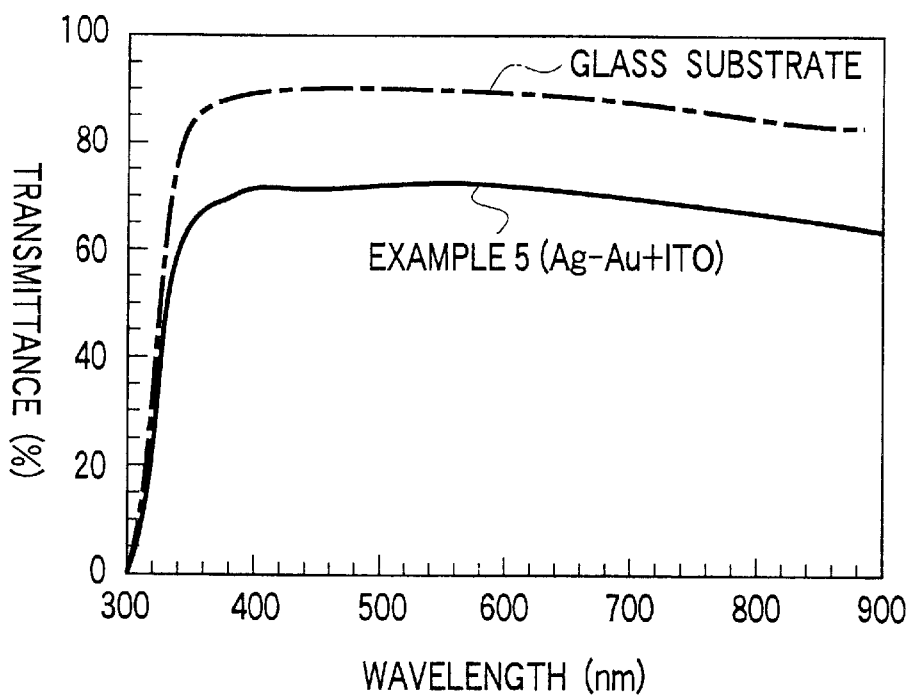
FIG. 10 is a graph showing the transmission profile of the transparent conductive layered structure in Example 5 and the glass substrate that is a structural material of this layered structure.

The film properties of the transparent 2-layer film formed on the glass substrate are shown in Table 1 below. Moreover, the reflection profile of the transparent conductive layered structure of Example 5 that was made are shown in FIG. 9 and the transmission profile are shown in FIG. 10.

EXAMPLE 6

A solution in which noble metal-coated silver microparticles with a mean particle diameter of 8.2 nm were dispersed was obtained by the same method as in Example 1.

Next, an ATO dispersion that had been obtained by using antimony tin oxide (ATO) microparticles with a mean particle diameter of 0.01 $\mu$m (SN-100P, brand name of Ishihara Sangyo Kaisha, Ltd) and by thorough desalting by ion-exchange was added to this solution to eventually obtain a coating liquid for forming a transparent conductive layer in which were dispersed noble metal-coated silver microparticles and ATO microparticles (Ag: 0.113%, Au: 0.247%, ITO: 0.072%, water: 11.6%, EA: 87.9%).

The content ratio of gold in the noble metal-coated silver microparticles was 68.6% from the composition ratio of the above-mentioned coating liquid for forming a transparent conductive layer.

Further, other than the fact that this coating liquid for forming a transparent conductive layer was used, the same treatment as in Example 1 was performed to obtain a glass substrate, having a transparent 2-layer film consisting of a transparent conductive layer containing noble metal microparticles consisting of silver and gold and a transparent coating layer consisting of a silicate film whose main component is silicon oxide, that is a transparent conductive layered structure of Example 6.

The film properties of the transparent 2-layer film formed on the glass substrate are shown in Table 1 below.

EXAMPLE 7

A concentrated dispersion of noble metal-coated silver microparticles was obtained by the same method as in Example 1 and a solution containing tetramethyl silicate tetramer (Methyl Silicate 51, brand name of Colcoat Co., Ltd.) as inorganic binder was added to this to obtain a coating liquid for forming a transparent conductive layer in which were dispersed noble metal-coated silver microparticles with a mean particle diameter of 8.2 nm (Ag: 0.113%, Au: 0.247%, $SiO_2$: 0.018%, water: 10.0%, EA: 89.6%).

The content ratio of gold in the noble metal-coated silver microparticles was 68.6 wt % from the composition ratio of the above-mentioned coating liquid for forming a transparent conductive layer.

Further, other than the fact that this coating liquid for forming a transparent conductive layer was used, the same treatment as in Example 1 was performed to obtain a glass substrate with a transparent 2-layer film made from a transparent conductive layer containing noble metal microparticles consisting of silver and gold and a transparent coating layer consisting of silicate film whose main component is silicon oxide, that is, the conductive transparent layered structure of Example 7.

The film properties of the transparent 2-layer film formed on the glass substrate are shown in Table 1 below.

EXAMPLE 8

Using a colloidal dispersion of silver microparticles prepared by the same method as in Example 1 (Ag: 0.45%), 15 g of an aqueous 1% solution of hydrazine monohydrate ($N_2H_4 \cdot H_2O$) were added to 83 g of this colloidal dispersion of silver microparticles and 600 g of an aqueous solution of potassium platinate (IV) [$K_2Pt(OH)_6$] (Pt: 0.075%) were added while agitating to obtain a colloidal dispersion of noble metal-coated silver microparticles coated with platinum only.

After concentrating this colloidal dispersion of noble metal-coated silver microparticles by ultrafiltration, pure water was added to this concentrate and the process of concentration by ultrafiltration was repeated. Ethanol (EA) and diacetone alcohol (DAA) were added to the desalted concentrate that was obtained to obtain a coating liquid for forming a transparent conductive layer in which were dispersed noble metal-coated silver microparticles with a mean particle diameter of 7.9 nm (Ag: 0.245%, Pt: 0.295%, water: 8.2%, EA: 86.2%, DAA: 5.0%).

Furthermore, the content ratio of platinum in the noble metal-coated silver microparticles was 54.6 wt % from the composition ratio of the above-mentioned coating liquid for forming a transparent conductive layer.

Moreover, other than the fact that this coating liquid for forming a transparent conductive layer was used, a glass substrate with a transparent 2-layer film made from a transparent conductive layer containing noble metal microparticles consisting of silver and platinum and a transparent coating layer consisting of silicate film whose main component is silicon oxide, that is, the conductive transparent layered structure of Example 8, was obtained as in Example 1

The film properties of the transparent 2-layer film formed on a glass substrate are shown in the following Table 1.

EXAMPLE 9

Using 28 g of a colloidal dispersion of silver microparticles prepared by the same method as in Example 1 and using 2.5 g of an aqueous 1% solution of hydrazine monohydrate ($N_2H_4.H_2O$) and a mixed solution of 60 g of an aqueous potassium aurate [$KAu(OH)_4$] solution (Au: 0.075%) and 60 g of an aqueous potassium platinate [$K_2Pt(OH)_6$] solution (Pt: 0.075%), a coating liquid for forming a transparent conductive layer in which were dispersed noble metal-coated silver microparticles with a mean particle diameter of 8.3 nm coated with a compound of gold and platinum (Ag: 0.182%, Au: 0.194%, Pt: 0.194%, water: 7.7%, EA: 91.7%) were obtained.

Furthermore, the content ratio of gold and platinum in the noble metal-coated silver microparticles was 68.1 wt % from the composition ratio of the above-mentioned coating liquid for forming a transparent conductive layer.

Moreover, other than the fact that this coating liquid for forming a transparent conductive layer was used, a glass substrate with a transparent 2-layer film made from a transparent conductive layer containing noble metal microparticles consisting of silver, gold and platinum and a transparent coating layer consisting of silicate film whose main component is silicon oxide, that is, the conductive transparent layered structure of Example 9, was obtained as in Example 1.

Figure 11:
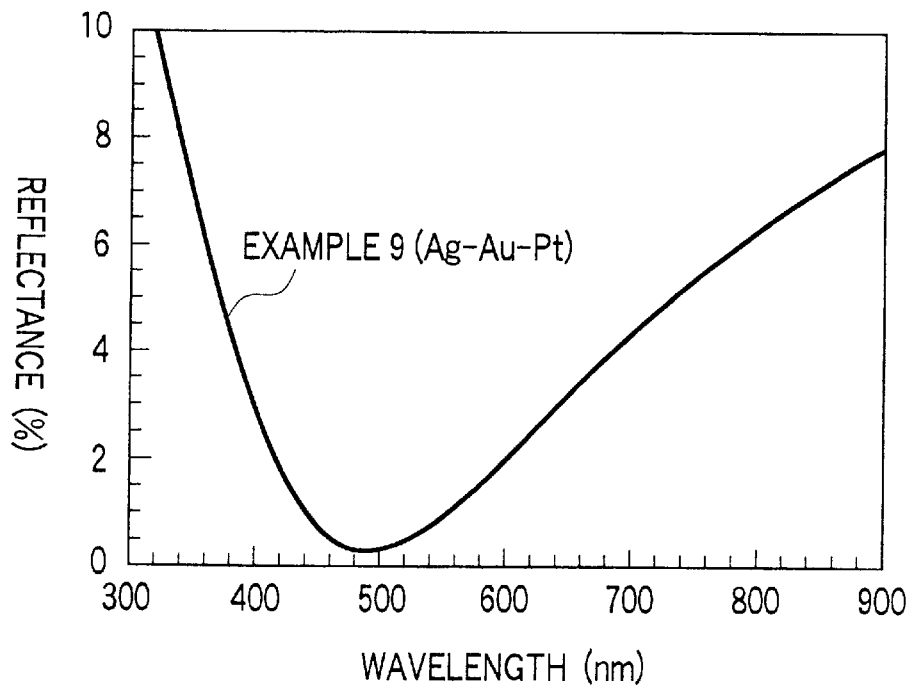
FIG. 11 is a graph showing the reflection profile of the transparent conductive layered structure in Example 9.
Figure 12:
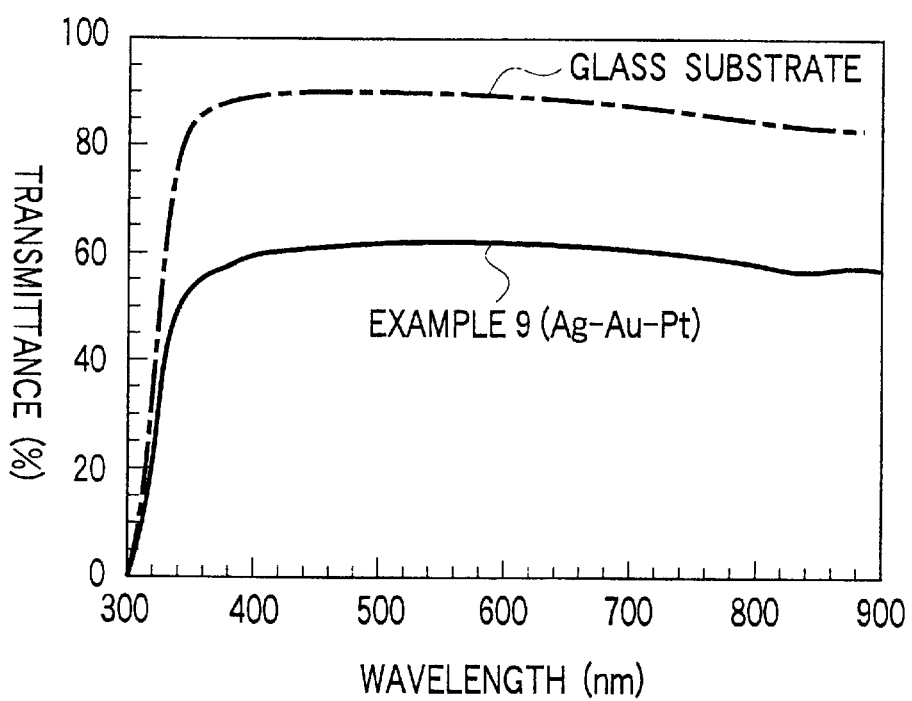
FIG. 12 is a graph showing the transmission profile of the transparent conductive layered structure in Example 9 and the glass substrate that is a structural material of this layered structure.

The film properties of the transparent 2-layer film formed on the glass substrate are shown in Table 1 below. Moreover, the reflection profile of the transparent conductive layered structure of Example 9 that was made is shown in FIG. 11 and the transmission profile is shown in FIG. 12.

COMPARATIVE EXAMPLE 1

Using a colloidal dispersion of silver microparticles that was prepared by the same method as in Example 1 (Ag: 0.45%), a coating solution for forming a transparent conductive layer in which were dispersed silver microparticles with a mean particle diameter of 6.9 nm (Ag: 0.3%, water: 4.0%, EA: 90.7%, DAA: 5.0%) was obtained without performing noble metal coating.

Moreover, other than the fact that this coating liquid for forming a transparent conductive layer was used, a silica sol liquid with an $SiO_2$ (silicon oxide) solid content concentration of 0.7% was spin coated (130 rpm, 60 seconds) and the product was further cured for 20 minutes at 180° C., a glass substrate with a transparent 2-layer film made from a transparent conductive layer containing silver microparticles and a transparent coating layer consisting of silicate film whose main component is silicon oxide, that is, the transparent conductive layered structure in Comparative Example 1, was obtained as in Example 1.

Film properties of the transparent 2-layer film formed on the glass substrate are shown in Table 1 below. Moreover, the reflection profile of the transparent conductive layered structure of Comparative Example 1 that was produced are shown in FIG. 1 and the transmission profile is shown in FIG. 2.

COMPARATIVE EXAMPLE 2

Coating liquid for forming a transparent conductive layer of ITO microparticles with a mean particle diameter of 30 nm dispersed in solvent (brand name SDA-104 of Sumitomo Metal Mining Co., Ltd., ITO: 2%) was spin coated (150 rpm, 60 seconds) onto a glass substrate (soda lime glass with a thickness of 3 mm) that had been heated to 40° C. Then a silica sol liquid that had been diluted to an $SiO_2$ (silicon oxide) solid content concentration of 1.0% was spin coated (150 rpm, 60 seconds) and the product was further cured for 30 minutes at 180° C. to obtain a glass substrate with a transparent 2-layer film made from a transparent conductive layer containing ITO microparticles and a transparent coating layer made from silicate film whose main component is silicon oxide, that is, the transparent conductive layered structure in Comparative Example 2.

Moreover, film properties of the transparent 2-layer film formed on the glass substrate are shown in Table 1. In addition, the reflection profile of the transparent conductive layered structure in Comparative Example 2 that was made is shown in FIG. 1.

COMPARATIVE EXAMPLE 3

Using a colloidal dispersion of silver microparticles prepared by the same method as in Example 1 (Ag: 0.45%), 0.5 g aqueous 0.5% hydrazine solution was added to 15 g of this colloidal dispersion of silver microparticles and then a mixed solution of 15 g aqueous potassium aurate [$KAu(OH)_4$] solution (Au: 0.05%) and 0.3 g aqueous 2% polymer dispersant solution was added while agitating to obtain a colloidal dispersion of noble metal-coated silver microparticles coated with gold only.

This colloidal dispersion of noble metal-coated silver microparticles was desalted with an ion-exchange resin (Diaion SK1B, SA20AP, brand names of Mitsubishi Chemical Corportion) and then concentrated by ultrafiltration. Ethanol (EA) and diacetone alcohol (DAA) were added to the concentrated liquid to obtain a coating liquid for forming a transparent conductive layer of Comparative Example 3 containing noble metal-coated silver microparticles with a mean particle diameter of 6.8 nm (Ag: 0.24%, Au: 0.028%, water: 3.7%, EA: 91.0%, DAA: 5.0%).

Furthermore, the content ratio of gold in the noble metal-coated silver microparticles was 10.4 wt % from the composition ratio of the above-mentioned coating liquid for forming a transparent conductive layer.

Moreover, other than the fact that this coating liquid for forming a transparent conductive layer was used, a silica sol liquid with an $SiO_2$ (silicon oxide) solid content concentration of 0.65% was spin coated (130 rpm, 60 seconds), and the product was futher cured for 20 minutes at 180° C., a glass substrate with a transparent 2-layer film made from a transparent conductive layer containing noble metal microparticles consisting of silver and gold and a transparent coating layer consisting of a silicate film whose main component is silicon oxide, that is, the transparent conductive layered structure in Comparative Example 3, was obtained.

Figure 13:
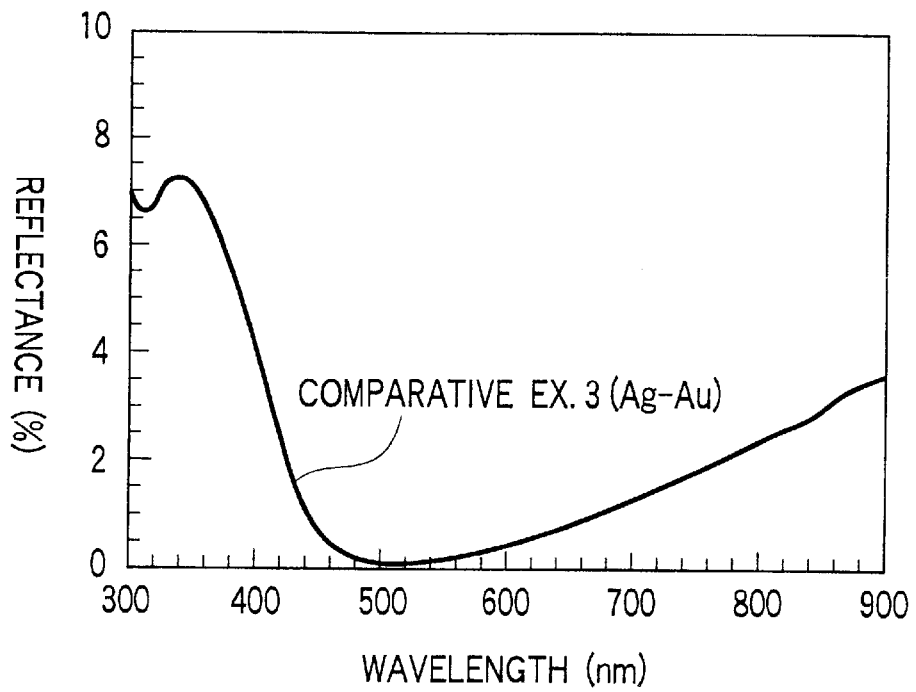
FIG. 13 is a graph showing the reflection profile of the transparent conductive layered structure in Comparative Example 3.
Figure 14:
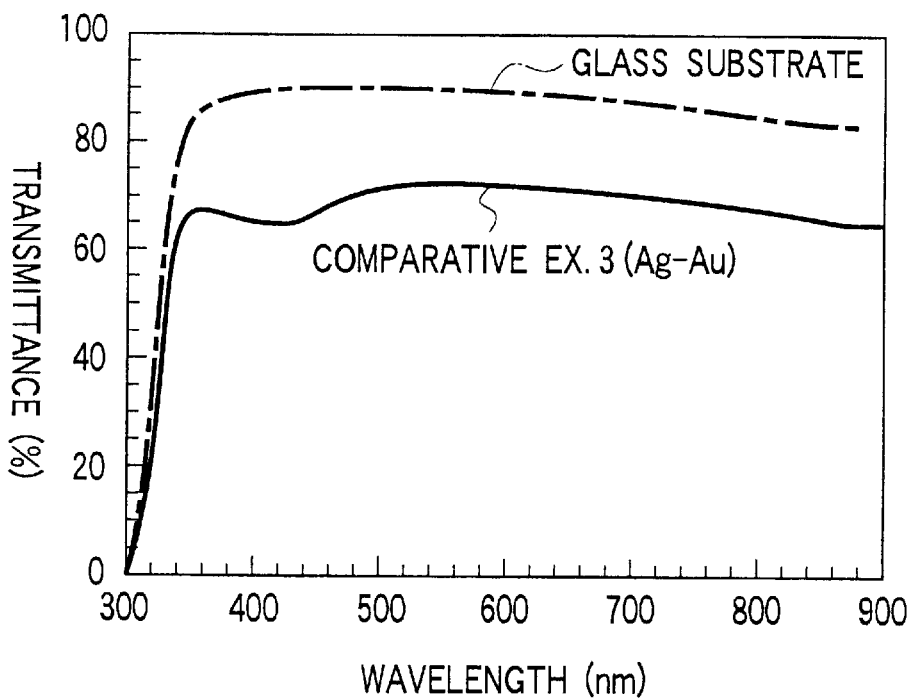
FIG. 14 is a graph showing the transmission profile of the transparent conductive layered structure in Comparative Example 3 and the glass substrate that is a structural material of this layered structure.

Film properties of the transparent 2-layer film formed on the glass substrate are shown in Table 1. Moreover, the reflection profile of the transparent conductive layered structure in Comparative Example 3 are shown in FIG. 13 and the transmission profile is shown in FIG. 14.

TABLE 1

| | Type of microparticles | Content ratio of noble metal (Note 1) | Surface resistance (Ω/□) | Visible Light ray transmittance (%) | Standard deviation of transmittance (Note 2) | Haze value (%) | Bottom reflectance (%)/bottom wavelength (nm) |
|---|---|---|---|---|---|---|---|
| Example 1 | Ag—Au | 68.7 wt % | 185 | 72.2 | 1.51 | 0.1 | 0.12/510 |
| Example 2 | Ag—Au | 68.7 wt % | 630 | 77.1 | 1.58 | 0.1 | 0.42/505 |
| Example 3 | Ag—Au | 76.8 wt % | 350 | 75.8 | 1.41 | 0.2 | 0.37/485 |
| Example 4 | Ag—Au | 81.5 wt % | 335 | 75.4 | 1.53 | 0.2 | 0.40/495 |
| Example 5 | Ag—Au + ITO | 68.6 wt % | 255 | 73.0 | 1.50 | 0.3 | 0.35/520 |
| Example 6 | Ag—Au + ATO | 68.6 wt % | 280 | 72.8 | 1.33 | 0.4 | 0.47/510 |
| Example 7 | Ag—Au | 68.6 wt % | 240 | 73.8 | 1.77 | 0.1 | 0.22/510 |
| Example 8 | Ag—Pt | 54.6 wt % | 1710 | 63.8 | 2.36 | 0.2 | 0.27/495 |
| Example 9 | Ag—Au—Pt | 68.1 wt % | 1635 | 60.0 | 1.80 | 0.3 | 0.25/490 |
| Comparative Example 1 | Ag | — | 980 | 70.9 | 6.67 | 0.1 | 0.23/485 |
| Comparative Example 2 | ITO | — | 16000 | 93.3 | — | 0.2 | 0.83/540 |
| Comparative Example 3 | Ag—Au | 10.4 wt % | 395 | 72.5 | 2.72 | 0.1 | 0.08/505 |

Note 1: Content ratio of noble metal (gold and/or platinum) to entire noble metal-coated silver microparticle.
Note 2: Value in terms of the transmittance (%) of the transparent 2-layer film only without the transparent substrate at each wavelength in 5 nm intervals in the visible light ray wavelength region (380 to 780 nm).

[Weather Resistance Tests]

The transparent conductive layered structures of Examples 1 through 9 and the transparent conductive layered structures of Comparative Examples 1 and 3 were immersed in 5% brine and surface resistance and film appearance of the transparent 2-layer film on the transparent substrate (glass substrate) were investigated. The results are shown in Table 2 below:

TABLE 2

| | Surface resistance (Ω/□) | | 2-Layer film appearance |
|---|---|---|---|
| | Initial value | Value after immersion in 5% brine | (transmittance, haze, reflection) |
| Example 1 | 185 | No change in surface resistance with immersion for 24 hours | No change in transmittance, haze, or reflection profile with immersion for 24 hours |
| Example 2 | 630 | No change in surface resistance with immersion for 24 hours | No change in transmittance, haze, or reflection profile with immersion for 24 hours |
| Example 3 | 350 | No change in surface resistance with immersion for 24 hours | No change in transmittance, haze, or reflection profile with immersion for 24 hours |
| Example 4 | 335 | No change in surface resistance with immersion for 24 hours | No change in transmittance, haze, or reflection profile with immersion for 24 hours |
| Example 5 | 255 | No change in surface resistance with immersion for 24 hours | No change in transmittance, haze, or reflection profile with immersion for 24 hours |
| Example 6 | 280 | No change in surface resistance with immersion for 24 hours | No change in transmittance, haze, or reflection profile with immersion for 24 hours |
| Example 7 | 240 | No change in surface resistance with immersion for 24 hours | No change in transmittance, haze, or reflection profile with immersion for 24 hours |
| Example 8 | 1710 | No change in surface resistance with immersion for 24 hours | No change in transmittance, haze, or reflection profile with immersion for 24 hours |
| Example 9 | 1635 | No change in surface resistance with immersion for 24 hours | No change in transmittance, haze, or reflection profile with immersion for 24 hours |
| Comparative example 1 | 980 | Surface resistance was >10$^6$ Ω/□ and impossible to determine with immersion for 15 minutes | Haze value rose with immersion for 30 minutes. Part of the transparent 2-layer film peeled off with immersion for 10 hours |
| Comparative example 3 | 395 | No change in surface resistance with immersion for 3 hours. Surface resistance changed to 3.1 K Ω/□ with immersion for 24 hours | No change in transmittance, haze value or reflection profile with immersion for 1 hour. Slight change in reflected color with immersion for 24 hours |

[Ultraviolet Ray Resistance Tests]
Ultraviolet rays were irradiated for 5 hours under conditions of 80 W/cm onto the transparent conductive layered structure of Examples 1 through 9 and the transparent conductive layered structures in Comparative Examples 1 and 3 using a metal halide lamp with a cold mirror and an infrared ray-cutting filter (Eye Graphics Co., Ltd.) and surface resistance and film appearance of the transparent 2-layer film on the transparent substrate (glass substrate) were investigated. The transparent conductive layered structure was set at a position 20 cm from the ultraviolet lamp and substrate temperature was raised to 60 to 65° C. during ultraviolet irradiation.

The results are shown in Table 3 below:

TABLE 3

| | Surface resistance ($\Omega/\square$) | | 2-Layer film |
| --- | --- | --- | --- |
| | Initial value | Value after 5 hours of ultraviolet irradiation | appearance (transmittance, haze value, reflection) |
| Example 1 | 185 | 189 | No changes in transmittance, haze value or reflection profile with 5 hours of irradiation |
| Example 2 | 630 | 640 | No changes in transmittance, haze value or reflection profile with 5 hours of irradiation |
| Example 3 | 350 | 356 | No changes in transmittance, haze value or reflection profile with 5 hours of irradiation |
| Example 4 | 335 | 341 | No changes in transmittance, haze value or reflection profile with 5 hours of irradiation |
| Example 5 | 255 | 260 | No changes in transmittance, haze value or reflection profile with 5 hours of irradiation |
| Example 6 | 280 | 284 | No changes in transmittance, haze value or reflection profile with 5 hours of irradiation |
| Example 7 | 240 | 246 | No changes in transmittance, haze value or reflection profile with 5 hours of irradiation |
| Example 8 | 1710 | 1750 | No changes in transmittance, haze value or reflection profile with 5 hours of irradiation |
| Example 9 | 1635 | 1655 | No changes in transmittance, haze value or reflection profile with 5 hours of irradiation |
| Comparative example 1 | 980 | Surface resistance was >10$^6$ $\Omega/\square$ and impossible to determine with irradiation for 1 hour | Transmittance rose by approximately 15% with irradiation for 5 hours Marked change in reflection profile and property deterioration |
| Comparative example 3 | 395 | 506 | No changes in transmittance, haze value or reflection profile with 5 hours of irradiation |

[Evaluation]

1. The following are confirmed from the results in Table 1:

(1) First, when compared to the surface resistance of 16,000 ($\Omega/\square$) of the transparent 2-layer film of Comparative Example 2, there is marked improvement of surface resistance ($\Omega/\square$) of the transparent 2-layer film in each example, and when compared to surface resistance of 980 ($\Omega/\square$) of the transparent 2-layer film in Comparative Example 1, there is improvement of surface resistance ($\Omega/\square$) of the transparent 2-layer film in Examples 1 through 7.

(2) Moreover, the value of the standard deviation of transmittance in each example is improved when compared to Comparative Example 1 (6.67) and Comparative Example 3 (2.72).

2. The following are confirmed from the profiles shown in FIGS. 1 through 4:

(1) As is clear from comparison of the reflection profile of the transparent conductive layered structure in Example 1 shown in FIG. 1 and the reflection profile of the transparent conductive layered structure of Comparative Examples 1 and 2 shown in the same FIG. 1 as well as the reflection profile of the transparent conductive layered structure of Comparative Example 3 shown in FIG. 13, reflection properties in the visible light ray wavelength region are improved with the transparent conductive layered structure in Example 1 when compared to Comparative Examples 1 through 3. Moreover, as is clear from comparison of the transmission profile of the transparent conductive layered structure in Example 1 shown in FIG. 2 and the transmission profile of the transparent conductive layered structure of Comparative Example 1 shown in the same FIG. 2 and the transmission profile of the transparent conductive layered structure of Comparative Example 2 in FIG. 14, an extremely flat transmission profile is obtained with the transparent conductive layered structure of Example 1 when compared to Comparative Examples 1 and 3.

That is, it is confirmed that the reflection properties in the visible light ray wavelength region and the transmission profile are improved with the transparent conductive layered structure in Example 1.

(2) Similarly, as is clear from comparison of the reflection profile of the transparent conductive layered structure of Comparative Examples 1 and 2 shown in FIG. 1 as well as the reflection profiles of the transparent conductive layered structure of Comparative Example 3 shown in FIG. 13 and the reflection profile of the transparent conductive layered structure of Examples 2, 3 and 5 shown in FIGS. 5, 7 and 9, the reflection properties in the visible light ray wavelength region are improved with the transparent conductive layered structure of Examples 2, 3 and 5 when compared to Comparative Examples 1 through 3. Moreover, as is clear from comparison of the transmission profile of the transparent conductive layered structure of Comparative Example 1 shown in FIG. 2 as well as the transmission profile of the transparent conductive layered structure of Comparative Example 3 shown in FIG. 14 and the transmission profile of the transparent conductive layered structure of Examples 2, 3, 5, and 9 shown in FIGS. 6, 8, 10 and 12, very flat transmission profile is obtained with the transparent conductive layered structures of Examples 2, 3, 5, and 9 when compared to Comparative Examples 1 and 3.

That is, it is confirmed that the reflection properties in the visible light ray wavelength region and transmission profile of the transparent conductive layered structures in Examples 2, 3 and 5 are improved and that the transmission profile of the transparent conductive layered structure in Example 9 is improved.

3. It is confirmed from the results in Table 2 that there is marked improvement in weather resistance of the 2-layer film of each example when compared to the transparent 2-layer film of Comparative Examples 1 and 3.

4. It is further confirmed from the results in Table 3 that there is marked improvement of ultraviolet ray resistance of the transparent 2-layer film of each example when compared to the transparent 2-layer film of Comparative Example 1 and Comparative Example 3.

Moreover, this indicates that there is marked improvement in weather resistance of the transparent 2-layer films of each example when compared to conventional film.

5. Furthermore, noble metal-coated silver microparticles were prepared in Examples 1 through 9 using potassium aurate and potassium platinate as the aurate and platinate. However, experiments were also performed using sodium aurate and sodium platinate in place of this potassium aurate and potassium platinate. In addition, the same evaluations as in Examples 1 through 9 were performed using noble metal-coated silver particles obtained using sodium aurate and sodium platinate. It is confirmed that the same evaluations are obtained.

What is claimed is:

1. A method of producing a transparent conductive layered structure having a transparent substrate and transparent conductive layer and transparent coating layer formed in succession on this transparent substrate, comprising the steps of:

applying a coating liquid for forming a transparent conductive layer on said transparent substrate;

then applying a coating liquid for forming a transparent coating layer; wherein said coating liquid comprises an inorganic binder and performing heat treatment, the main components of said coating liquid for forming a transparent conductive layer being noble metal-coated silver microparticles with a mean diameter of 1 to 100 nm, wherein the surface of silver microparticles is coated with gold or platinum only or a compound of gold and platinum and the gold and/or platinum content is within a range exceeding 50 wt % up to 95 wt %, and a solvent that will disperse these microparticles.

2. A method of producing a transparent conductive layered structure according to claim 1, wherein said coating liquid for forming a transparent conductive layer comprises conductive oxide microparticles.

3. A method of producing a transparent conductive layered structure according to claim 2, wherein said conductive oxide microparticles are one or more types of microparticles selected from tin oxide, tin antimony oxide, or indium tin oxide.

4. A method of producing a transparent conductive layered structure according to claims 1 through 3, wherein said coating liquid for forming said transparent conductive layer comprises inorganic binder that makes up the binder matrix of the transparent conductive layer.

5. A method of producing the transparent conductive layered structure according to claim 1 or 4, wherein the main component of the inorganic binder of said coating liquid for forming a transparent conductive layer and said coating liquid for forming a transparent coating layer is silica sol.

* * * * *